United States Patent [19]

Saito et al.

[11] Patent Number: 5,034,940
[45] Date of Patent: Jul. 23, 1991

[54] INFORMATION RETRIEVAL SYSTEM WITH A TRACKING ERROR THRESHOLD COMPENSATION OF RETRIEVED DATA AND TRACKING ERROR SIGNALS

[75] Inventors: Atsushi Saito, Ichikawa; Takeshi Maeda, Kokubunji, both of Japan

[73] Assignee: Hitachi, Ltd., Tokyo, Japan

[21] Appl. No.: 162,660

[22] Filed: Mar. 1, 1988

[30] Foreign Application Priority Data

Mar. 20, 1987 [JP] Japan .................................. 62-63777

[51] Int. Cl.$^5$ .............................................. G11B 7/09
[52] U.S. Cl. ............................ 369/44.34; 369/44.36;
369/54; 369/124
[58] Field of Search ...................... 369/44, 46, 13, 17,
369/48, 54, 55, 59, 106, 110, 124, 44.25, 44.26,
44.29, 44.32, 44.34, 44.36; 360/27, 32, 39, 45,
55, 77.02–77.03; 358/342; 235/454, 456

[56] References Cited

U.S. PATENT DOCUMENTS

| | | | |
|---|---|---|---|
| 4,190,859 | 2/1980 | Kinjo | 369/124 X |
| 4,488,277 | 12/1984 | McFarlane et al. | 369/124 X |
| 4,499,570 | 2/1985 | Immink et al. | 369/48 |
| 4,562,564 | 12/1985 | Bricot et al. | 369/44 |
| 4,674,081 | 6/1987 | Gerard et al. | 369/44.34 X |
| 4,706,235 | 11/1987 | Melbye | 369/59 X |
| 4,748,609 | 5/1988 | Yonezawa et al. | 369/44 |
| 4,768,108 | 8/1988 | Higurashi | 360/27 X |
| 4,785,442 | 11/1988 | Ohtake et al. | 369/44 |
| 4,802,024 | 1/1989 | Knowlton | 360/27 X |
| 4,819,222 | 4/1989 | Kimura | 369/124 |
| 4,831,613 | 5/1989 | Kanda | 369/106 X |
| 4,833,662 | 5/1989 | Yoda | 369/124 X |
| 4,835,759 | 5/1989 | Saito et al. | 369/124 X |

FOREIGN PATENT DOCUMENTS

| | | |
|---|---|---|
| 3545996 | 7/1986 | Fed. Rep. of Germany . |
| 3621326 | 1/1987 | Fed. Rep. of Germany . |
| 2156978 | 10/1985 | United Kingdom . |
| 2170632 | 8/1986 | United Kingdom . |
| 2178218 | 2/1987 | United Kingdom . |

*Primary Examiner*—Roy N. Envall, Jr.
*Assistant Examiner*—W. R. Young
*Attorney, Agent, or Firm*—Fay, Sharpe, Beall, Fagan, Minnich & McKee

[57] ABSTRACT

As an optical spot (20) is scanned along a recording track (B) it interacts with optical markers (14, 16) disposed at regular intervals along adjacent sides of the track. Each interaction with an optical marker causes a peak value which is sampled and held (74, 76). A clock (46) derives a clock signal from the regular periodicity of the optical markers. A logic circuit (48) controls the sample and hold circuits such that the peak amplitude attributable to each optical marker is temporarily held. An adder (52) combines peak values attributable to optical markers on opposite sides of the track to produce a threshold signal (100) indicative of a sum or average thereof. A comparator (58) compares data (56) read from the track with the threshold signal. The comparator indicates a "1" level in response to the data signal exceeding a threshold a "0" level in response to the data signal being below the threshold level. A decoder (60) is clocked by the clock pulses to convert the 1 and 0 indications into a binary pulse train. In this manner, the threshold level which distinguishes between 1's and 0's varies or floats in accordance with the relative interaction of the optical beam and the optical markers on one or the other side of the track, i.e. the misalignment of the optical beam and the track. The threshold signal also varies in accordance with variations in the recording medium.

19 Claims, 5 Drawing Sheets

INFORMATION RETRIEVAL SYSTEM WITH A TRACKING ERROR THRESHOLD COMPENSATION OF RETRIEVED DATA AND TRACKING ERROR SIGNALS

The present invention relates to the field of information retrieval. It finds particular application in conjunction with optical reproducing system for reading out data signals accurately and will be described with particular reference thereto. It is to be appreciated, however, that the invention may find application in conjunction with other data retrieval apparatae.

BACKGROUND OF THE INVENTION

Heretofore, data has been electromagnetically recorded along data tracks on a rotating disk. Optically monitorable structures or pits were arranged along the disk to refine the position of the tracks. More specifically, the tracks were arranged in concentric circles or in a spiral around an axis of rotation of the disk. Conventionally, the pits were disposed to either side of the track. A concentrated laser lightspot was passed along the track, between the pits, and the intensity and polarity of reflective light were monitored. As the laser passed over a pit, the intensity of reflected light was changed.

In perfect alignment, the reflected light intensity reduction as a spot passed a pit on one side of the track was the same as the reflected light intensity reduction when the spot passed a pit on the other side of the track. When the pits on one side of the track reduced the intensity of the reflected light more than pits on the other side, a misalignment was indicated. By monitoring the difference in the intensity of light reflected as a spot passed the pits on the left side of the track relative to the intensity of reflected light as the spot passed pits on the right side of the track, the tracking error could be determined. See for example U.S. Pat. No. 4,562,564 to Bircot et al., issued Dec. 31, 1985. A servo system adjusted the position of the lightspot and any associated reading structure or readhead relative to the rotating disk in accordance with the monitored left-right pit intensity difference.

Although laser light tracking systems were effective for maintaining tracking alignment, small tracking errors were inherent in the servo control and correction system. Even small tracking errors as small as 0.1 micrometers caused significant variations in the amplitude of the read data signal. As the amplitude was reduced, interpretation of the data signal became ambiguous. For example, when reading digital data, the amplitude of the analog value representing 1's was reduced. With sufficient misalignment, the analog amplitude of a digital 1 was reduced into the amplitude region allocated for 0's causing an encoded 1 to be read as a 0. Reading digital 1's as 0's, of course, caused significant errors in the retrieved data.

In accordance with the present invention, a method and apparatus is provided for reducing ambiguities in the retrieved data attributable to readhead/track misalignment.

SUMMARY OF THE INVENTION

In accordance with the present invention, a degree of misalignment of a laser spot and a recording track is determined from the relative reflection or absorption of light by the optical markers on either side of the track. An adjustment or compensation is made in the data signal in accordance with the determined degree of misalignment. More specifically to the preferred embodiment, the retrieved data signal is compared with a reflective light intensity signal whose magnitude varies in accordance with the degree of determined misalignment. When reading digital data, a threshold amplitude which demarcates between 1's and 0's varies in accordance with the reflective light intensity signal and media characteristic deviation.

In accordance with another aspect of the present invention, an apparatus is provided for retrieving data that is encoded on a recording track. A reflective light monitoring means monitors reflectivity variations along the recording track. A threshold means set a threshold level in accordance with the monitored reflectivity variations. A comparing means compares the threshold level with data read from the recording track. More specifically to the preferred embodiment, each read analog data value is compared with the threshold to determine whether it represents a 1 or a 0.

In accordance with an analogous aspect of the invention, a method is provided for retrieving data encoded on a recording track which is scanned by a data reading means. Encoded data from the recording track is read as the degree of misalignment between the recording track and the reading means is monitored. A threshold level is adjusted in accordance with monitored degree of misalignment. The read encoded data is interpretted in accordance with threshold level, which threshold level varies with the degree of misalignment.

In accordance with a more limited aspect of the present invention, an apparatus for retrieving recorded data is provided. A recording medium has at least first and second optical reference markers, such as wobble pits, disposed adjacent a recording track. An optical scanning means scans the recording track with an optical beam. A data reading means retrieves data recorded on the track between the optical reference markers and produces an analog data signal in accordance therewith. A reflective light intensity signal means generates a reflective light intensity signal which varies in accordance with a degree of interaction between the optical beam and the optical markers. A first sampling means samples the reflective light intensity signal as the beam scans adjacent the first optical markers to produce first sampled signals. A second sampling means samples the reflective light intensity signal as the optical beam scans adjacent the second optical markers to produce a second sampled signal. A combining means combines the first and second sampled signals. A comparing means compares the combined first and second sampled signals with the retrieved analog data signal.

In accordance with yet another aspect of the present invention, a method is provided for retrieving data encoded on a recording track which is scanned by an optical beam and which has first and second optically recognizable markers therealong. The optical beam is scanned along the track. Variations are monitored as the beam is scanned adjacent the first and second optical reference markers. A threshold level is adjusted in accordance with the monitored variations. The encoded data is read from the track and compared with the threshold level.

A first advantage of the present invention is that it approves the reliability of retrieved data.

Another advantage of the present invention is that it improves the differentiation between 1's and 0's of digitally recorded data.

Another advantage of the present invention is that it reduces the influence of variations in media characteristics.

Yet another advantage of the present invention resides in an improvement in tracking stability of automatic tracking adjustment systems.

Further advantages of the present invention will become apparent to those of the ordinary skill in the art upon reading and understanding the following detailed description of the preferred embodiments.

BRIEF DESCRIPTION OF THE DRAWINGS

The invention may take form in various steps and arrangements of steps and in various components and arrangements of components. The drawings are only for purposes of illustrating a preferred embodiment and are not to be construed as limiting the invention.

DETAILED DESCRIPTION OF THE PREFERRED EMBODIMENT

Figure 1A:
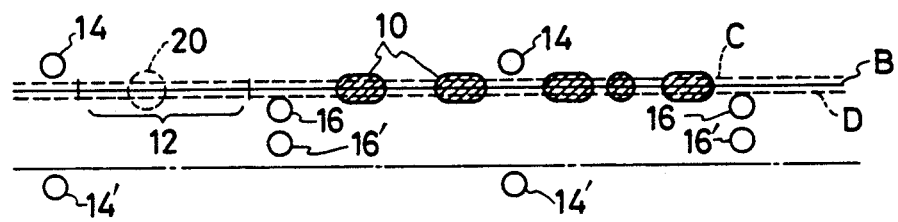
FIG. 1A illustrates a segment of a recording medium which is scanned by a laser lightspot in accordance with the present invention.

With reference to FIG. 1, data 10 is encoded, preferably electromagnetically, in data regions 12 centered along a virtual data recording track B. A series of first optical reference markers 14 and a series of second optical reference markers 16 are disposed at regular intervals symmetrically to opposite sides of the virtual track B. Preferably, the optical markers are wobble pits that are deviated or wobbled symmetrically, the same distance the left and right sides of the track. An adjacent track includes data segments 12', and analogous wobble pits 14' and 16'.

A focused laser lightspot 20 is disposed in alignment with an optical sensor 22 which receives reflected light as the lightspot scans along the track. The amount or amplitude 24 of received light varies generally with the degree of interaction between the lightspot and the markers. In the preferred embodiment, the amount of reflected light decreases as the lightspot interacts with each of the optical markers or wobbled pits.

Figure 1B:
FIG. 1B illustrates reflected light intensity when the laser lightspot is centered on the data track.
Figure 1C:
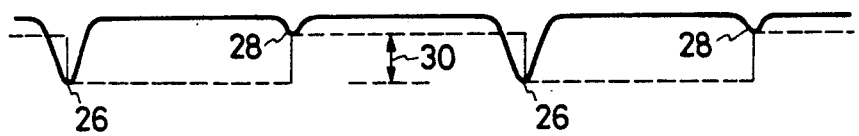
FIG. 1C illustrates reflected light intensity when the center of the laser lightspot is offset above the data track.
Figure 1D:
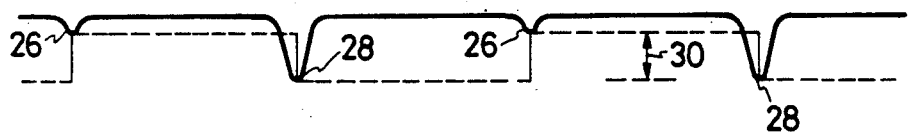
FIG. 1D illustrates reflected light intensity when the laser spot is centered below the data track.

Reference to FIG. 1B, when the lightspot is accurately aligned with the track B, peaks 26 and 28 corresponding to the left and right optical markers 14 and 16, respectively, have the same amplitude or peak value. With reference to FIG. 1C, if the center of the lightspot 20, deviates towards the left side of the track B and scans along a closely adjacent parallel path C, the lightspot interacts to a different degree with the left and right optical markers. The peaks 26 from the left or first optical markers 14 with which the lightspot interacts more strongly than when it is centered on track B are relatively large amplitude. By distinction, the peaks 28 from the right or second optical markers with which the lightspot interacts more weakly are smaller. A difference 30 between the first marker peaks 26 and the second marker peaks 28 is indicative of the degree of misalignment between the optical spot 20 and the virtual track B. With reference to FIG. 1D, when the optical spot is centered to the right of the virtual track along a path D, the optical spot interacts more strongly with the right or second optical markers 16 than with the left or first optical markers 14. The first optical marker peaks 26 are, accordingly, smaller than the second optical marker peaks 28. The difference 30, in the peak values is again indicative of the degree of misalignment. The sign of the difference 30 is indicative of the direction of the misalignment. The intensity or amplitude of the read data signal varies analogously to the peaks 26 and 28, although the variation for a given amount of misalignment is preferably smaller than the difference 30.

When the lightspot 20 is centered on the track B, the peak values can be sampled, held, and used as a reference value or basis for data recognition. However, even a small deviation of the lightspot from the virtual track B causes large variations in the peak values, rendering the peak values unreliable as a reference values. The variations in the peak values can become so large that a threshold or reference value based on the peak can vary to such an extent that data recognition becomes difficult. Because the wobble pits 14. 16 are disposed more off-center than the data 10 from the track B, misalignment of the lightspot and the track causes greater variations in the reflected light from the pits or marks than in the sensed data.

In order to select a threshold or reference value for data recognition which varies in accordance with the variations in a sensed or read data signal, the first and second peak values 26, 28 are summed or averaged. The average level does not change as greatly as the difference between the peak values. Rather, the average peak value varies more analogously to the variations in the sensed data amplitude.

Figure 2:
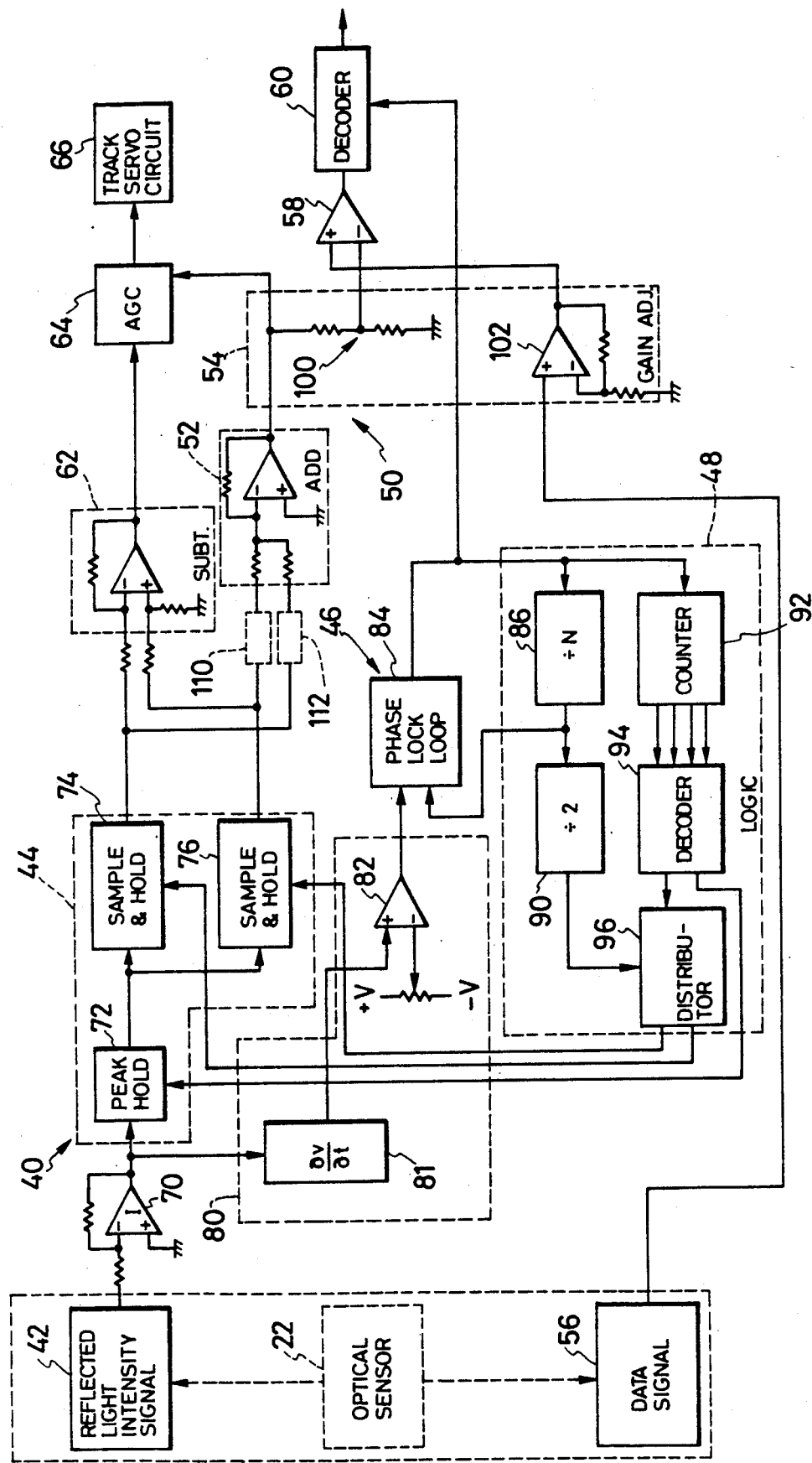
FIG. 2 is a diagrammatic illustration of an automatic data correction system in accordance with the present invention.

With reference to FIG. 2, a misalignment monitoring means 40 monitors misalignment between the track and the optical spot 20 or other data reading means. More specifically, a reflective light intensity signal means 42 generates a reflectivity or light intensity signal that changes as the optical spot or beam scans the optical markers. A peak sampling means 44 samples the reflectivity or light intensity signal as the spot interacts with each marker. A clock means 46 generates a clock signal from the periodicity of the markers. A logic circuit 48 controls the sampling and resetting of the peak sampling such that each left marker peak value 26 and right marker peak value 28 is monitored. A threshold means 50 sets a threshold in accordance with the misalignment monitored by the misalignment monitoring means. More specifically, a summing or averaging means 52 sums or averages the left and right marker peak values from the peak sampling means 44. A gain or amplitude adjustment means 54 adjusts the relative magnitude of at least one at the average peak amplitude or threshold signal and a data signal from a data signal means 56. A comparing means 58 compares the threshold level with the data signal. More specifically to the preferred embodiment, the data signal is an analog signal which is indicative of digital 1's and 0's. The comparing means 56 compares the analog data signal with the threshold level to determine the data signals represent 1's or 0's.

A decoder 60 converts the 1 and 0 indications from the comparing means into a digital data train. More specifically, the decoder 60 is clocked by the clock means 46 to produce digital 1's and 0's in accordance with the 1 or 0 indication from the comparing means.

A difference means 62 determines a difference between the peak amplitudes to produce a tracking error signal. An automatic gain control means 64 adjusts the difference or tracking error signal in accordance with the threshold signal. A conventional tracking servo circuit 66 utilizes the threshold adjusted or tracking error signal for automatically adjusting the alignment of the optical spot and the virtual track.

In the preferred embodiment, the recording medium is an optical magnetic disk. As is conventional in the art, data is recorded in a magnetizable film of the disk by varying the magnetization in a vertical magnetizing direction. The polarization plane of the laser beam 20 rotates according to the direction of magnetization. The data signal means 56 derives the read data signal from the polarization rotation. The light intensity signal means 42, by distinction, detects changes in the amount of reflected light. In this manner, the light intensity signal means is only able to recognize information from the wobble pits or markers. Again, as the laser spot deviates from the center of the virtual track, the total amount of light reflected from the data region 12, hence the magnitude of the data signal, is reduced.

In a read only type optical disk, the data is commonly encoded in pits. Various prior techniques are known for distinguishing between the data pits and the wobble pits. For example, a series of wobble pits is arranged in a regularly repeating pattern as in sector or synchronization marks. The pattern or periodicity in the wobble pits makes them distinguishable from the more randomly, disposed data pits. As another alternative, a code may be provided in or among the wobble pits as illustrated in greater detail in the above reference U.S. Pat. No. 4,562,564.

Figure 3:
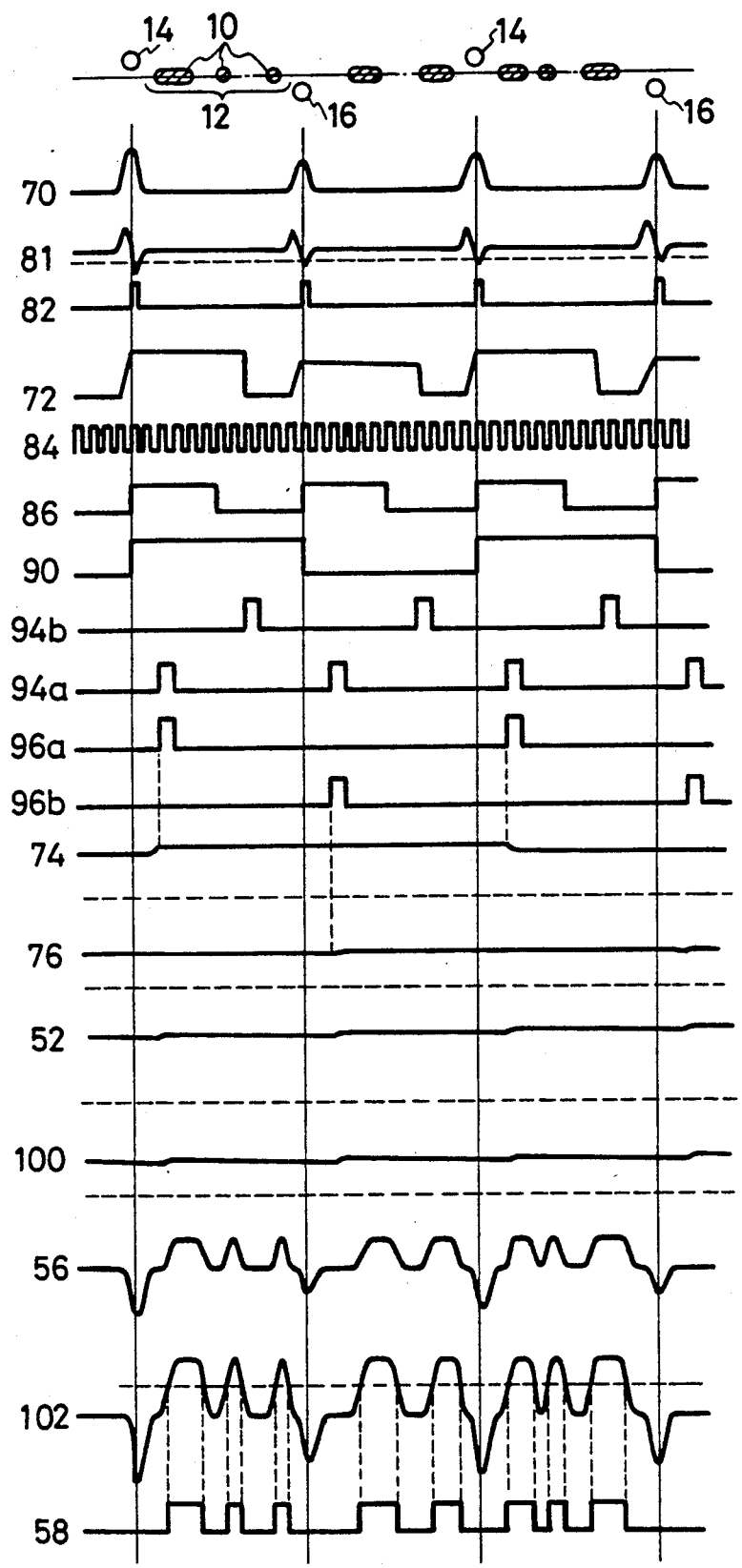
FIG. 3 is a diagrammatic illustration of the output signals of like numbered components of the circuit of FIG. 2.

Looking to FIG. 2 in greater detail and FIG. 3 in which the output signals of selected components are denoted by the same reference numeral, an invertor 70 amplifies and inverts the reflective signal peaks forming the output denoted at 70 in FIG. 3. The peak sampling means 44 includes a peak hold circuit 72 which resets itself to and holds the highest value or amplitude of the input signals which it receives until it is reset. A first sample and hold circuit 74 samples and holds the value of the peak hold circuit 72 corresponding to the first optical markers 14. A second sample and hold circuit 76 samples and holds the output value of the peak hold circuit 72 corresponding to the second optical markers 16.

A peak position detector 80, more specifically a differentiating circuit 81, accurately detects the center of each of peaks 26, 28, hence of the wobble pits. The differentiating circuit may be a simple circuit formed of a resistor and a capacitor or it may be an active differentiating circuit. A comparing circuit 82 compares the output 81 of the differentiating circuit with a fixed threshold value to produce a binary pulse that marks the center of each peak. The clock circuit 46 includes a phase lock loop 84 which multiplies the binary pulse of signal 82 by an integer N, 12 in the preferred embodiment to produce a clock signal. In this manner, 12 clock pulses are generated between each of the first and second optical marks 16 and 18 which enables up to 12 bits of data to be stored in the data segment 12. Changing the clock sequence changes the number of bits of data that are stored in each data sequence. A divider circuit 86 divides the output 84 of the clock circuit by N, the number of clock pulses between each pair of pits to produce an output signal which is returned to the phase lock loop circuit. The phase lock loop circuit compares the signal from comparing means 82 with the signal from divider 86 and acts as a servo circuit to change the frequency and phase angle of the oscillating output such as the phase angle of the two signals coincide with each other. In this manner, the clock pulses are maintained synchronous with the binary pulse from the comparator 82.

The logic circuit means 48 derives control signals for the peak sampling means 44 from the clock signal 84. A second divider 90 divides the output of the first divider 86 by 2 to produce an output which marks alternate optical markers, i.e. left or right markers. The clock signal from the phase clock loop circuit 84 is counted by a counter 92 to produce parallel, digital output signals which are received by a decoder 94. The decoder 94 has a sample output 94a which produces a sample signal 94a at pre-selected number of counts after each reflective light intensity signal peak, two counts in the preferred embodiment. A distribution circuit 96 is controlled by the output signal on the second divider 90 to distribute the sample signal between two outputs, 96a and 96b. The first output 96a causes the first sample and hold means 74 to sample the output of the peak hold circuit 72, two counts after the center of each first optical marker 14. The second output 96b causes the second sample and hold 76 to sample the output of the peak hold circuit 72, two counts after each second optical marker 16. The decoder 94 further produces a reset signal on a reset output 94b a pre-selected duration after each optical marker to reset the peak hold circuit 72 before the laser spot 20 crosses the next marker or pit. In the preferred embodiment, peak hold circuit is reset 8 counts after the preceding pit.

The decoder 94 may be a read only memory or may utilize simple gate logic. The distribution circuit 96 may be a conventional selector circuit which is stepped by the high/low state at the output of the second divider 90.

The adding means 52 includes a summing junction and an amplifier which sums the outputs of the first and second sample and hold circuits. The sum 52 of the peak levels or threshold level does not change widely even when the lightspot deviates from accurate alignment with the track. The amplitude or gain adjusting means 54 includes a voltage divider 100 which reduces the amplitude of the sum from the adding means 52. The amplitude of the data signal 56 is adjusted by an amplifier 102 of the gain adjusting means 54. In this manner, the gain adjusting means 54 adjusts the relative gain or amplitude at the data signal and the threshold signal. When the voltage divider or the gain adjusting means effectively divides the sum by 2, for example, then the sum is actually representative of the average of the two sample and hold signals.

The comparing means 58 includes a comparator or differential amplifier which receives the threshold signal 100 in one input and the data signal 56 in the other. When the data signal exceeds the threshold level, the comparator 58 produces a high or 1 signal. When the data signal is below the threshold value, the comparator produces a low or 0 signal. The decoder 60 decodes the 1 and 0 signals into original data words.

The subtraction means 62 includes a differential amplifier whose output represents a difference between the levels of the outputs of the 2 sample and hold circuits. The differential signal, which represents the tracking error, is fed to the automatic gain control circuit 64.

The sum signal is conveyed to the automatic gain control 64. The automatic gain control circuit adjusts the error signal in accordance with the variation in the sum or threshold signal.

In the preferred embodiment, the optical detection system is set such that the variations in the data signal have the opposite polarity to the wobble pit signals. By changing the polarity of the data and pit signals, the pit signals are easily separated from the data.

In the preferred embodiment, the data signals are quantized into merely 1's or 0's, i.e. a binary quantitization, with a single threshold value. Optionally, the data can be compressed such that each of the data positions in the data region 12 can store a plurality of bits. For example, the voltage divider may produce a plurality of threshold values, for example 3 threshold values. The comparing means may compare the amplitude of the analog data signal 56 with the 3 thresholds which define four amplitude regions. The comparing means may produce any one of four outputs, expressed binarily 00, 01, 10, 11. As another option, the data signal or the binary signal may be differentiated and the zero crossing point may be detected analogously to the detection of the center of the pits signals by a differentiating means and a digitizer.

Figure 4:
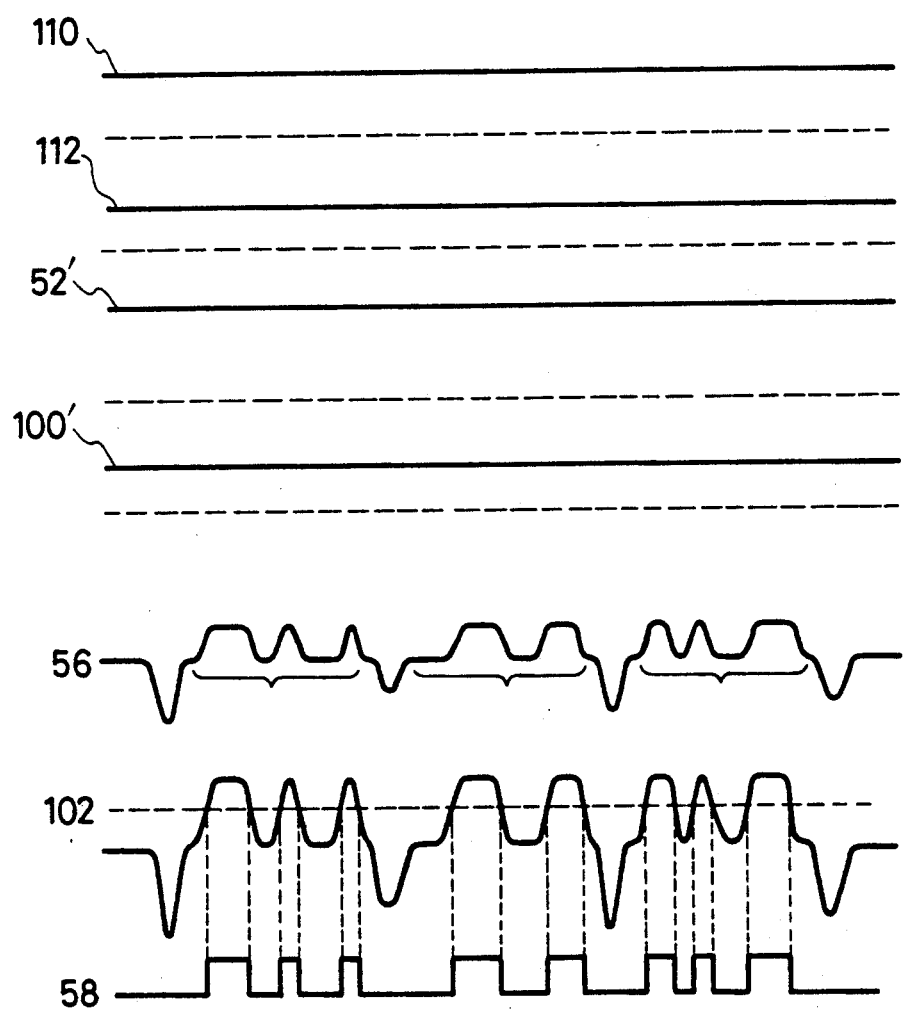
FIG. 4 illustrates output signals of selected components of an alternate embodiment of FIG. 2 which encorpates signal smoothing low pass filters.

With reference to FIG. 4, as yet another option first and second low pass filters 110 and 112 may be inserted after the first and second sample and hold circuits 74 and 76 or after the adding means 52 to smooth the signals. The low pass filter reduces a variation in the sum signal 52' from the adding means 52 as illustrated in FIG. 4.

Figure 5A:
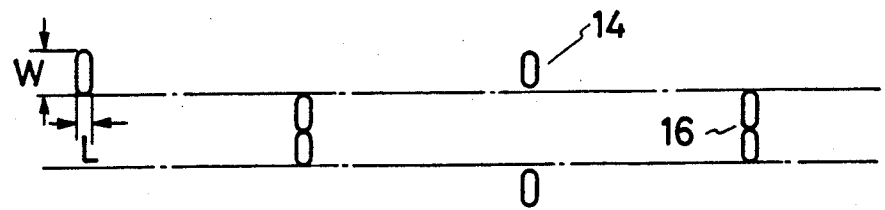
FIGS. 5A, B, and C illustrate alternate embodiments of the recording medium; and, FIG. 6 illustrates an alternate embodiment in which the data signal teamed by differential detection.

With reference to FIG. 5, the wobble pits may be elongated having a short length L and a width W. In the embodiment FIG. 5A, the pit width W is set to half the interval between adjacent tracks. In this manner, the sum of the peak values from the pits on the left and the right sides of the tracks will remain substantially unchanged even when the spot deviates from the track. The pit length L is preferably larger than the diameter of the lightspot to promote a sufficient signal level. When differential detection is used to detect the peak center position, the pit length L may be made smaller than the lightspot diameter.

Figure 5B:
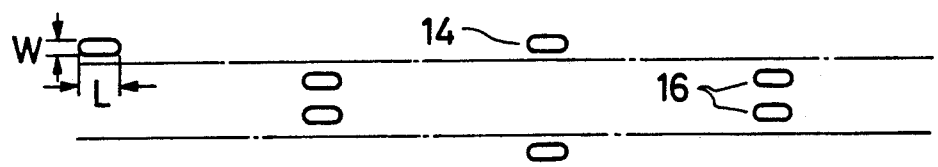
Figure 5C:
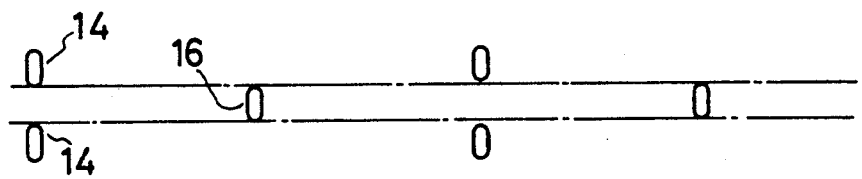

In the preferred embodiment of FIG. 5B, the pit length L is greater than the pit width W. In the embodiment of FIG. 5C, the second pits have been combined into single pit which enables the tracks to be positioned more closely adjacent.

In the preferred embodiment, the pit signals and the data signals are handled by separate systems. However, there are other methods of detecting the optical magnetic signal. In one prior art method, a single optical element such as a polarized beam splitter and a Glan-Thompson analyzer are utilized to transmit specific polarization components. In another prior art method, two optical elements is used to turn the polarization plane penetrating axis of the optical elements in opposite directions from the extinction axis, receive the lights that have penetrated the optical elements by the light detectors, take the difference, and obtain the magnetized signal. Optionally, a half wavelength plate may be utilized to turn the polarization plane or the reflected light from the disk by 45 degrees. This functions as a polarized beam splitter to separate the penetrating and reflected light. By taking the difference between the penetrating and reflected light, the data and wobble pit signals can be separated.

The differential detection of the optical magnetic signal is better able to reduce the noise components that depend on the quantity of light such as laser noise and disk noise by offsetting them against each other. Accordingly, when there is an interference between the pit signals and the data signals, the pit components are offset against each other and eliminated because they represent changes in the reflected light quantity. The magnetization data, by distinction, is indicated by changes in polarization.

Figure 6:
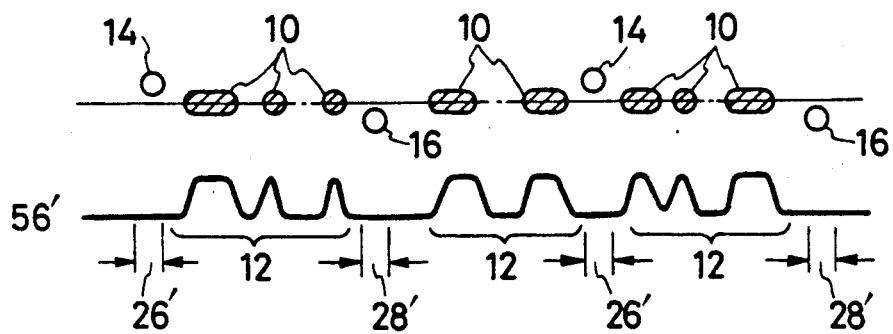

In the embodiment of FIG. 6, the data signal 56' is detected by differential detection. It can be seen that the reflected light from the wobble pits does not appear due to the offset. The level of the differential signal portions 26', 28' attributable the wobble pits is almost constant regardless of the density of the data. Accordingly, it is possible to sample and hold the levels of the differential or tracking error signal during periods 26' and 28' and use them as the threshold reference. If the pit signals are not completely offset by the differential detection, the areas immediately before and after the wobble pits, where data is not recorded, may be extended. The signal level from this unrecorded area is detected relative to the level 26', 28' attributable to the pits to remove the undesirable effect of the pits.

The invention has been described with reference to the preferred embodiment. Obviously, modifications and alterations will occur to those of ordinary skill in the art on reading and understanding the preceding detailed description. It is intended that the invention be construed as including all such alterations and modifications insofar as they come within the scope of the appended claims or the equivalent thereof.

Having thus described the preferred embodiment, the invention is now claimed to be:

1. An apparatus for retrieving recorded data, the apparatus comprising:
   a recording medium having at least first and second optical markers disposed adjacent a recording track along which data is encoded:
   an optical scanning means for scanning the recording track with an optical beam;
   a light detecting means for generating a light intensity signal which changes as the optical beam scans the optical markers;
   a first sampling means for sampling the light intensity signal as the beam scans adjacent to the first optical markers to produce first sampled light intensity signals;
   a second sampling means for sampling the light intensity signal as the optical beam scans adjacent the second optical markers to produce second sampled light intensity signals;

a combining means for combining the first and second sampled light intensity signals;

a data signal means for generating an analog data signal in accordance with the encoded data; and, a comparing means for comparing the combined first and second sampled light intensity signals with the analog data signal.

2. The apparatus as set forth in claim 1 wherein the first optical markers include a series of pits at intervals along one side of the data track and wherein the second optical markers include a series of second pits along another side of the recording track.

3. The apparatus as set forth in claim 1 further including a peak detector for detecting a peak signal value corresponding to the change in the light intensity signal as it scans each optical marker.

4. The apparatus as set forth in claim 3 wherein the optical markers are spaced with a regular periodicity and further including a clock means operatively connected with the peak detector for deriving a clock signal from the changes in the optical beam as it scans the optical markers.

5. The apparatus as set forth in claim 4 further including a logic means operatively connected with the clock means for receiving clock signals therefrom and operatively connected with the peak detector and the first and second sampling means for controlling sampling and resetting thereof.

6. The apparatus as set forth in claim 1 further including an amplitude adjusting means for adjusting the relative amplitude of the combined first and second sampled light intensity signals and the data signal.

7. The apparatus as set forth in claim 6 wherein the comparing means compares the analog data signal with the combined first and second sampled light intensity signals and produces 1 and 0 indications in accordance with the comparison, whereby the 1 and 0 indications are determined in accordance with an alignment of the optical beam and the recording track.

8. The apparatus as set forth in claim 7 wherein the combining means includes an adding means for summing the first and second sampled tracking signals, whereby the analog data signal is compared with a sum or average of the first and second light intensity signals.

9. The apparatus as set forth in claim 1 further including:

a difference means for subtractively combining the first and second sampled light intensity signals to produce a difference signal;

an automatic gain control means for adjusting the difference signal in accordance with the combined first and second sampled light intensity signals; and, a servo means for adjusting an alignment between the optical beam and the recording track in accordance with the adjusted difference signal.

10. An apparatus for retrieving data encoded on a recording track that is scanned by a data reading means, the apparatus comprising:

a misalignment monitoring means for monitoring misalignment between the recording track and the data reading means;

a threshold means for setting a threshold level, the threshold means being operatively connected with the misalignment means for setting the threshold in accordance with the monitored misalignment; and, a comparing means for comparing the threshold level with data read from the recording track, the comparing means being operatively connected with the threshold means and the data reading means.

11. A method of retrieving data encoded on a recording track which is scanned by a data reading means, the method comprising:

reading encoded data from the recording track, monitoring a degree of misalignment between the recording track and the reading means;

adjusting a threshold level in accordance with the degree of misalignment; and, interpreting the read encoded data, in accordance with the threshold level, whereby the interpretation of read data is adjusted in accordance with a threshold level that varies with the misalignment of the recording track and the data reading means.

12. The method as set forth in claim 11 further including adjusting alignment of the reading means and the recording track in accordance with the monitored degree of misalignment.

13. The method as set forth in claim 11 further including digitizing the read encoded data in accordance with a comparison of the read encoded data and the threshold level.

14. The method as set forth in claim 11 wherein the monitoring step includes monitoring variations in reflected light caused by optical markers disposed adjacent to the recording track as a laser spot is scanned along the track.

15. The method as set forth in claim 14 wherein the reading step includes monitoring variations in polarization of reflected light as the laser spot is scanned along a track.

16. A method of retrieving encoded data from a recording track which is scanned by an optical beam and which has first and second optically recognizable referenced markers therealong, the method comprising:

scanning the optical beam along the track, monitoring optical variations as the beam is scanned adjacent the first and second optical markers., adjusting a threshold level in accordance with the monitored optical variations;

reading encoded data from the track; and, comparing the read encoded data with the threshold level.

17. The method as set forth in claim 16 wherein the first optical markers are disposed adjacent one side of the track and the second optical markers are disposed adjacent an opposite side of the track and wherein the step of monitoring optical variations includes:

deriving a first light intensity signal in accordance with the optical variations attributable to the first optical markers;

deriving a second light intensity signal in accordance with optical variations attributable to the second optical markers; and, combining the first and second light intensity signals, the threshold level being adjusted in accordance with the combined light intensity signals.

18. The method as set forth in claim 17 wherein the step of combining the light intensity signals includes summing the first and second light intensity signals.

19. The method as set forth in claim 18 further including:

subtracting the first and second light intensity signals to create a tracking error signal;

adjusting the tracking error signal in accordance with the sum of the first and second light intensity signals; and, adjusting alignment of the optical beam and the track in accordance with the adjusted tracking error signal.

* * * * *